3,322,749
DERIVATIVES OF PENICILLANIC ACID AND
CEPHALOSPORANIC ACID
Leonard Bruce Crast, Jr., North Syracuse, N.Y., assignor to Bristol-Myers Company, New York, N.Y., a corporation of Delaware
No Drawing. Filed July 21, 1965, Ser. No. 473,834
10 Claims. (Cl. 260—239.1)

This invention relates to new synthetic compounds of value as antibacterial agents, as nutritional supplements in animal feeds, as agents for the treatment of mastitis in cattle, and as therapeutic agents in poultry and animals, including man, in the treatment of infectious diseases caused by Gram-positive and Gram-negative bacteria and, more particularly, relates to 7-(1,2,5-thiadiazole-3-acetamido)cephalosporanic acid, 6-(1,2,5-thiadiazole-3-acetamido)penicillanic acid and related salts and derivatives.

Antibacterial agents of the penicillin class have proven highly effective in the therapy of infections due to Gram-positive bacteria but nearly all such penicillins are ineffective against numerous so-called resistant strains of bacteria, e.g., benzylpenicillin-resistant strains of *Staphylococcus aureus* (*Micrococcus pyrogenes* var. *aureus*) and Gram-negative bacteria, e.g., *Salmonella enteritidis* and *Klebsiella pneumoniae*. It was the object of the present invention to provide novel compounds effective against both Gram-positive and Gram-negative bacteria including the resistant strains. It was a further object of the present invention to provide penicillins and cephalosporins active against Gram-positive and Gram-negative bacteria which are also efficiently absorbed upon oral administration to man and animals.

The objects of the present invention have been achieved by the provision, according to the present invention, of the acid of the formula

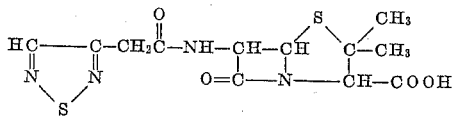

and nontoxic, pharmaceutically acceptable salts thereof.

The objects of the present invention have also been achieved by the provision, according to the present invention, of a compound of the formula (I)

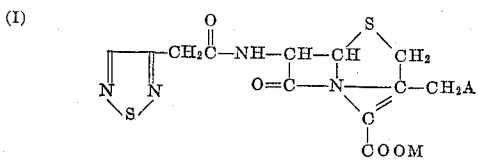

wherein

A is a member selected from the group consisting of hydrogen, hydroxyl, (lower)alkanoyloxy containing 2–8 carbon atoms, e.g., acetoxy, propionoyloxy, butanoyloxy, pentanoyloxy, etc., benzoyloxy, a quaternary ammonium radical, e.g., pyridinium, quinolinium, picolinium, lutidinium, and when taken together with M, a monovalent carbon-oxygen bond; and
M is a member selected from the group consisting of hydrogen, a pharmaceutically acceptable nontoxic cation, an anionic charge when A is a quaternary ammonium radical, and when taken together with A, a monovalent carbon-oxygen bond.

For clarity, we have illustrated below the formulae of the compounds when, in Formula I, A is a quaternary ammonium radical (pyridinium) and M is an anionic charge and when A and M together are a monovalent carbon-oxygen bond.

(II)

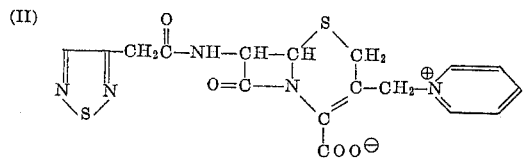

(III)

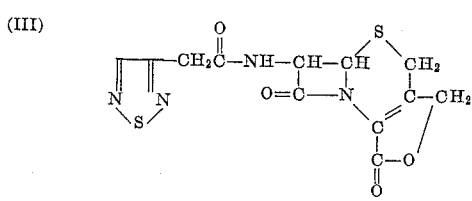

The preferred embodiments of the present invention are the free acids and salts thereof of which the free acids have the formulae

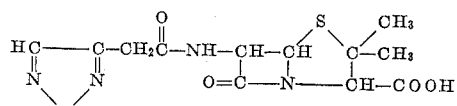

(IV)

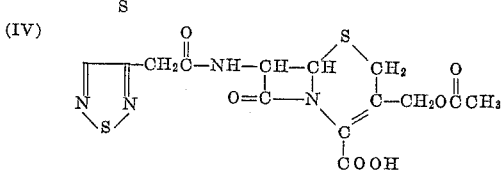

and (V)

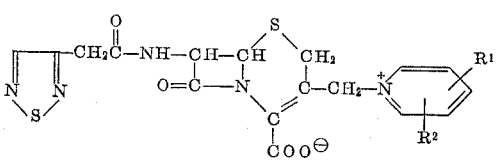

wherein $R^1$ and $R^2$ each represents hydrogen or methyl.

The pharmaceutically-acceptable, nontoxic cations include metallic cations such as sodium, potassium, calcium and aluminum and organic amine cations such as trialkylamines, e.g., triethylamine, procaine, dibenzylamine, N-benzyl-β-phenethylamine, 1-ephenamine, N,N'-dibenzylethylenediamine, dehydroabietylamine, N,N'-bis-dehydroabietylethylenediamine, N-(lower)-alkylpiperidines, e.g., N-ethylpiperidine, and other amines which have been used to form salts with benzylpenicillin.

The products of the present invention are prepared by the reaction of 6-aminopenicillanic acid or a compound of the formula (VI)

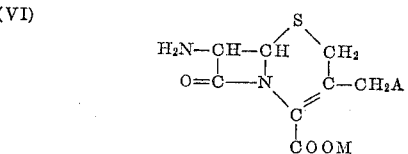

wherein A and M are described above (preferably in the form of a neutral salt such as the sodium salt or the triethylamine salt, i.e., when A is hydrogen, hydroxy, (lower)alkanoyloxy or benzoyloxy) with an active ester, e.g., 2,4-dinitrophenyl ester, p-nitrophenyl ester or N-hydroxysuccinimide ester, of the acid having the formula

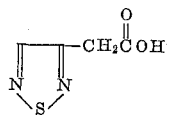

or with its functional equivalent as an acylating agent for a primary amino group. Such equivalents include the corresponding carboxylic chlorides, bromides, acid anhydrides, including mixed anhydrides and particularly the mixed anhydrides prepared from stronger acids such as the lower aliphatic monoesters of carbonic acid, of alkyl and aryl sulfonic acids and of more hindered acids such as diphenylacetic acid. In addition, an acid azide or active thioester (e.g., with thiophenol, thioacetic acid), may be used or the free acid itself may be coupled with 6-aminopenicillanic acid or the compound of Formula VI by the use of enzymes or of a carbodiimide reagent [cf. Sheehan and Hess, J. Amer. Chem. Soc., 77, 1067 (1955)]. Another equivalent of the 2,4-dinitrophenyl and p-nitrophenyl esters is a corresponding azolide, i.e., an amide of the corresponding acid whose amide nitrogen is a member of a quasi-aromatic five-membered ring containing at least two nitrogen atoms, i.e., imidazole, pyrazole, the triazoles, benzimidazole, benzotriazole and their substituted derivatives. As an example of the general method for the preparation of an azolide, N,N'-carbonyldiimidazole is reacted with a carboxylic acid in equimolar proportions at room temperature in tetrahydrofuran, chloroform, dimethylformamide or a similar inert solvent to form the carboxylic acid imidazolide in practically quantitative yield with liberation of carbon dioxide and one mole of imidazole. Dicarboxylic acids yield diimidazolides. The byproduct, imidazole, precipitates and may be separated and the imidazolide isolated, but this is not essential. The methods for carrying out these reactions to produce a penicillin or a cephalosporin and the methods used to isolate the penicillin or the cephalosporin so-produced are well-known in the art (cf. U.S. Patents Nos. 3,079,314, 3,117,126 and 3,129,224 and British Patents Nos. 932,644, 957,570 and 959,054).

The compounds of Formula VI used in the present invention include 7-aminocephalosporanic acid and derivatives of 7-aminocephalosporanic acid. 7-aminocephalosporanic acid is prepared by hydrolysis of cephalosporin C and has the formula

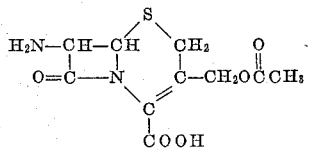

Acid hydrolysis of cephalosporin C to produce 7-aminocephalosporanic acid results in the coproduction of the lactone, 3-hydroxymethyl-7-aminodecephalosporanic acid lactone, formed by the further hydrolysis of the acetoxy group and subsequent internal esterification. The lactone has the formula

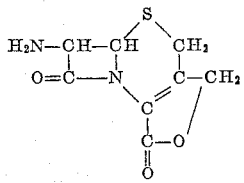

Enzymatic hydrolysis of the acetoxy group of 7-aminocephalosporanic acid results in the formation of 3-hydroxymethyl-7-aminodecephalosporanic acid having the formula

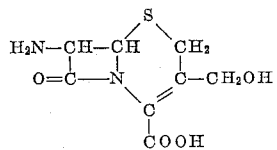

and such compound may be re-esterified with benzoic acid or a lower alkanoic acid, e.g., acetic acid, propionic acid and the like to form other esters. Preferably, re-esterification is carried out on a 3-hydroxymethyl-7-(isothiazolylacetamido)-decephalosporanic acid which is obtained by enzymatic hydrolysis of a 7-(isothiazolylacetamide)cephalosporanic acid.

Treatment of cephalosporin C with a tertiary amine, e.g., pyridine, lutidines, picolines and the like, followed by acid hydrolysis produces a nucleus which, in the case of pyridine, has the formula

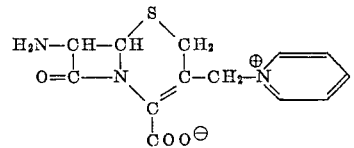

and has been given the name 3-pyridiniummethyl-7-aminodecephalosporanic acid inner salt.

The foregoing nuclei and the preparation thereof are known in the art and are described for example in U.S. Patent No. 3,117,126 and British Patents Nos. 932,644, 957,570 and 959,054.

3-methyl-7-aminodecephalosporanic acid having the formula

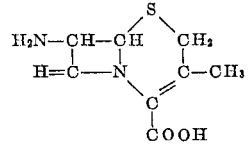

is produced by catalytic reduction of cephalosporin C followed by hydrolytic removal of the 5-aminodipoyl side chain as described in U.S. Patent No. 3,129,224.

STARTING MATERIALS

The ring system having the structure

is named 1,2,5-thiadiazole with the atoms numbered as indicated.

The starting material (per se or after conversion to an acid halide, mixed anhydride, ester or similar acylating derivative) for the preparation of the antibacterial agents of the present invention has the formula

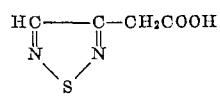

and is named 1,2,5-thiadiazol-3-yl-acetic acid.

*4-nitro-2,1,3-benzothiadiazole.*—To a stirred slurry cooled in an ice-salt-acetone bath to 0° C. of 100 g. (0.72 mole) of 2,1,3-benzothiadiazole in 280 ml. concentrated $H_2SO_4$ there was added a solution of 60 ml. conc. $HNO_3$ and 90 ml. conc. $H_2SO_4$ at such a rate as to maintain the temperature at 0° C. When the addition has been completed the reaction mixture was allowed to come to room temperature; after 30 minutes at 22° C. the mixture was poured onto 3 l. crushed ice with stirring to precipitate the product, 4-nitro-2,1,3-benzothiadiazole, which was collected by filtration, washed with water (3× 500 ml.), air-dried, recrystallized from ethanol and found to weigh 102 g.

*1,2,5-thiadiazole-3,4-dicarboxylic acid.*—To a stirred slurry of 25 g. (0.138 mole) of 4-nitro-2,1,3-benzothiadiazole in 500 ml. water at 60° C. there was added at 65°–70° C. over a 45 minute period a solution of 131 g. (0.828 mole) of $KMnO_4$ in 2.6 l. water. A small amount of 95% $C_2H_5OH$ was used to destroy any unreacted $KMnO_4$ and the warm solution was filtered and the $MnO_2$ cake washed with 400 ml. warm (70° C.) water. To the filtrate with stirring there was slowly added 80 ml. conc. $HNO_3$ and then a solution of 23.5 g. $AgNO_3$ in 50 ml. water was added all at once with good stirring. After 15 hours cooling to about 5° C. the silver 1,2,5-thiadiazole-3,4-dicarboxylate (29 g.) was collected and washed with water.

Silver 1,2,5-thiadiazole-3,4-dicarboxylate (122 g.) was stirred in 2 l. water for 1.5 hours while gaseous H₂S was passed through the slurry at a vigorous rate. After removal of the precipitated silver sulfide by filtration, the water was removed by distillation in vacuo at 60°–70° C. to leave crystalline 1,2,5-thiadazole-3,4-dicarboxylic acid which after drying under high vacuum (0.1–1.0 mm. Hg) over P₂O₅ for 24 hours was found to weigh 76 g. Recrystallization of 40 g. from glacial acetic acid gave 21 g., M.P. 182°–184° C. U.S. Patent 3,027,381 reports M.P. 184° C.

*1,2,5-thiadiazole-4-carboxylic acid.*—A mixture of 120 ml. phenetole and 21 g. (0.1207 mole) of 1,2,5-thiadiazole-3,4-dicarboxylic acid was heated to 145°–150° C. for 24 hours and then cooled to precipitate 1,2,5-thiadiazole-4-carboxylic acid which was recrystallized from nitromethane and vacuum-dried over P₂O₅ and then found to weigh 15 g. and to melt at 162°–165° C. U.S. Patent 3,027,381 reports M.P. 162°–164° C.

*1,2,5 - thiadiazole-3-carbonyl chloride.*—Thionyl chloride (50 ml.) and 1,2,5-thiadiazole-4-carboxylic acid (15 g., 0.1154 mole) were refluxed on the steam bath for 18 hours. The excess thionyl chloride was removed by distillation in vacuo at 30° C. to leave the product, 1,2,5-thiadiazole-3-carbonyl chloride, as a yellow oil which was dissolved in 200 ml. of petroleum ether of B.P. 40°–60° C. and filtered through filter paper to remove a small amount of solid material. The solvent was then removed by distillation in vacuo to leave the product as an oil which crystallized upon cooling.

*3-diazoacetyl-1,2,5-thiadiazole.*—A solution of diazomethane was prepared just before use by stirring at 0° C. a mixture of 500 ml. ether and 135 ml. of 40% aqueous KOH while adding 45 g. nitrosomethylurea in small portions over a one hour period. The ether was decanted over KOH pellets and dried for 2.5 hours. It was then poured into a one-liter Erlenmeyer flask and with stirring and cooling in an ice-salt-acetone bath the 1,2,5-thiadiazole-3-carbonyl chloride prepared above and dissolved in 150 ml. dry ether was added during a 10–15 minutes period. After stirring an additional 15 minutes the ether was removed under reduced pressure to leave 3-diazoacetyl-1,2,5-thiadiazole as a crystalline residue which after recrystallization from cyclohexane weighed 11 g., was yellow and a lachrymator, M.P. 86°–89° C. After drying in vacuo over P₂O₅ the M.P. was 89°–91° C.

*1,2,5-thiadiazole-3-acetic acid.*—A mixture of 3-diazoacetyl-1,2,5-thiadiazole, 75 ml. benzyl alcohol and 75 ml. dimethylaniline was heated at 182° C. for about one hour until the nitrogen evolution ceased. Ether (500 ml.) was added to the pre-cooled solution and the mixture was washed three times with 300 ml. 6 N HCl and then once with water. The ether layer was dried 60 hours over anhydrous MgSO₄, filtered and evaporated under reduced pressure to an oil which was heated on the steam bath for 20 hours in 90 ml. conc. HCl and 90 ml. glacial acetic acid. After cooling, the mixture was slowly treated with 10% aqueous NaOH with good cooling until pH 8 was reached. The mixture was then extracted five times with 200 ml. ether and the aqueous phase was filtered, cooled and with stirring acidified to pH 2 with 6 N HCl. The acidified aqueous phase was then saturated with salt and extracted three times with 200 ml. ether. The combined extracts were dried 3 hours over anhydrous MgSO₄ and filtered and the MgSO₄ was washed ten times with 20 ml. ether. The washings were combined with the filtrate and evaporated at 25° C. in vacuo to give the product, 1,2,5-thiadiazole-3-acetic acid, as an oil which was further dried by azeotropic distillation therefrom of 150 ml. benzene at 25° C. and 20 mm. Hg pressure to leave the product as a crystalline solid, weight 4 g., M.P. 60°–70° C., which was recrystallized from warm toluene to give 3.5 g., M.P. 77°–78° C.

*1,2,5 - thiadiazole-3-acetyl chloride.*—1,2,5-thiadiazole-3-acetic acid (1.44 g., 0.005 mole) was heated on the steam bath for 20 minutes with 9 ml. thionyl chloride and then the excess SOCl₂ was removed under reduced pressure at 30° C. Twice a 25 ml. portion of petroleum ether was added and then removed under reduced pressure to remove the last traces of SOCl₂ and leave 1,2,5-thiadiazole-3-acetyl chloride as an orange oil. See "Chemistry of 1,2,5-Thiadiazole," Indiana University Ph.D. thesis of Richard Yutze Wen, University Microfilms, Inc., Ann Arbor, Mich. (1962).

The following examples will serve to illustrate the present invention without limiting it thereto.

*Example 1*

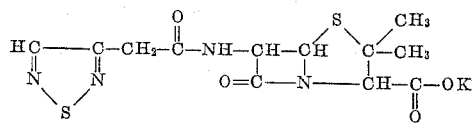

A mixture of 722 mgm. (0.005 mole) of 1,2,5-thiadiazole-3-acetic acid and 9 ml. of thionyl chloride was heated on the steam bath for 20 minutes and the excess SOCl₂ removed under reduced pressure at 25° C. Two portions (25 ml.) of petroleum ether were added and each was removed in vacuo so as to remove the last traces of SOCl₂. The residual oily 1,2,5-thiadiazole-3-acetyl chloride was dissolved in 25 ml. of methylene chloride and added dropwise, at 0° C. with stirring, to a previously prepared solution of 1.08 g. (0.005 mole) of 6-aminopenicillanic acid, 1.4 ml. (0.010 mole) of triethylamine and 25 ml. of CH₂Cl₂ which was obtained by stirring at 22° C. for thirty minutes and then filtering. After the addition the resulting solution was stirred ten minutes in ice-salt bath and one hour with the bath removed. The CH₂Cl₂ solution was then extracted with three 25 ml. portions of water and two 25 ml. portions of 5% NaHCO₃. The combined aqueous extracts were layered with 50 ml. of ether, cooled, and stirred in an ice bath while 40% H₃PO₄ was added until pH 2 was reached. The ether extract was combined with a second 25 ml. ether extract and washed with three 25 ml. portions of water. The ether solution, containing the 6-(1,2,5-thiadiazole-3-acetamido)penicillanic acid, was then dried 10 minutes over anhydrous MgSO₄ in an ice bath, filtered and treated with 2.5 ml. of 50% KEH (potassium 2-ethylhexanote in n-butanol). The product crystallized immediately and was cooled for 10 minutes in an ice bath, collected by filtration, washed with three 10-ml. portions of acetone and three 10-ml. portions of "Skellysolve B" (pet. ether B.P. 40–60° C.) and dried for 30 minutes at 1 mm. Hg. over P₂O₅. The yield was 900 mg. of potassium 6-(1,2,5-thiadiazole-3-acetamido)penicillanate which decomposed at 229–230° C. IR and NMR spectra were consistent with structure.

*Analysis.*—Calcd. for C₁₂H₁₃N₄O₄S₂K: C, 37.89; H, 3.44. Found: C, 37.76; H, 3.65.

This product was found to inhibit *Staph. aureus* Smith at 0.016–0.031 mcg./ml., to inhibit *Salmonella enteritidis* at about 0.25 meg./ml. and to exhibit versus *Staph. aureus* Smith and *Salmonella enteritidis* in mice a CD₅₀ of 0.36 mgm./kg. and 28 mgm./kg., respectively, upon oral administration and to have an acute toxicity of greater than 20 mgm./kg.

*Example 2*

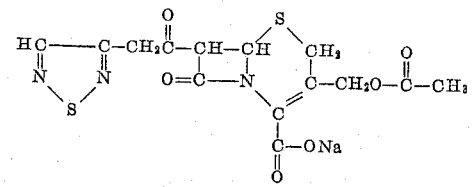

A mixture of 722 mgm. (0.005 mole) of 1,2,5-thiadiazole-3-acetic acid and 5 ml. thionyl chloride was heated on the steam bath for 20 minutes and the excess SOCl₂ removed under reduced pressure at 25° C. Two portions (25 ml.) of petroleum ether were added and each was removed in vacuo to remove the last traces of $SOCl_2$. The residual, oily 1,2,5-thiadiazole-3-acetyl chloride was dissolved in 25 ml. methylene chloride and added dropwise at 0° C. with stirring to a previously prepared solution of 1.36 g. (0.005 mole) of 7-aminocephalosporanic acid, 1.4 ml. (0.010 mole) triethylamine and 25 ml. $CH_2Cl_2$ which was obtained by stirring at 22° C. for 30 minutes and then filtering. After the addition the resulting solution was stirred ten minutes in the ice-salt bath and then for an hour with the bath removed. The $CH_2Cl_2$ solution was then extracted with three 25 ml. portions of water and two 25 ml. portions of 5% aqueous $NaHCO_3$. The combined aqueous extracts were layered with 50 ml. ethyl acetate, cooled and stirred in an ice-bath while 40% $H_3PO_4$ was added until pH 2 was reached. The ethyl acetate extract was combined with a second 25 ml. ethyl acetate extract and washed three times with 25 ml. portions of water. The ethyl acetate solution containing the 7-(1,2,5-thiadiazol-3-acetamido)cephalosporanic acid was then dried 10 minutes over anhydrous $MgSO_4$ in an ice bath, filtered and treated with 2.5 ml. of a 50% solution in n-butanol of sodium 2-ethylhexanoate. The product crystallized immediately and was cooled for 10 minutes in an ice bath, collected by filtration, washed with three 10 ml. portions and three 10 ml. portions of petroleum ether (B.P. 40°-60° C.) and dried for 30 minutes at 1 mm. Hg over $P_2O_5$. The yield was 1.20 g. of crystalline sodium 7-(1,2,5-thiadiazole - 3 - acetamido)cephalospornate having a decomposition point of about 204° C. and NMR and IR spectra consistent with the desired structure and indicative of a high state of purity.

Analysis.—Calc'd for $C_{14}H_{13}N_4O_6S_2Na$: C, 40.00; H, 3.12. Found: C, 40.18; H, 3.27.

This product was found to inhibit Staph. aureus Smith at about 0.125 mcg./ml., to inhibit the benzylpenicillin-resistant Staph. aureus Bx1633-2 at about 0.8 mcg./ml., to inhibit Salmonella enteritidis at about 1.6 mcg./ml. and to exhibit versus Staph. aureus Smith in mice a $CD_{50}$ of 3.8 mgm./kg. by intramuscular administration and a $CD_{50}$ of 3.8 mgm./kg. by oral administration and to exhibit versus Salmonella enteritidis in mice a $CD_{50}$ of about 140 mgm./kg. by intramuscular administration and a $CD_{50}$ of about 230 mgm./pg. by oral administration.

*Example 3*

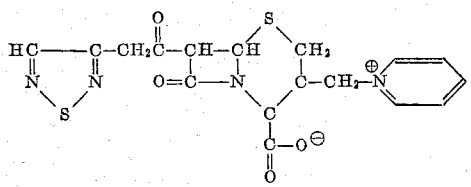

3 - pyridiniummethyl 7 - aminodecephalosporanic acid inner salt (1.5 g.) is shaken with methylene chloride at room temperature until the mixture becomes homogeneous and this solution is used in place of the 7-aminocephalosporanic acid solution in the procedure of Example 2 to prepare 3-pyridiniummethyl-7-(1,2,5-thiadiazole - 3 - acetamido)decephalosporanic acid inner salt. This product is sensitive to light so that it is advisable to protect it from light as much as practical during its manufacture and subsequent processing and packaging.

*Example 4*

1,2,5-thiadiazole-3-acetic acid (0.002 mole) and 2,4-dinitrophenol (0.002 mole) are dissolved in dry dioxane (10 ml.) and the solution is cooled in an ice bath. N,N'-dicyclohexylcarbodiimide (0.002 mole) is added and the solution is shaken well and left at room temperature for 45 minutes. The precipitated urea is removed by filtration and washed with ethyl acetate (25 ml.). The filtrate and washings are combined and concentrated in vacuo at room temperature to leave as the residue the desired 2,4-dinitrophenyl 1,2,5-thiadiazole-3-acetate.

3-pyridiniummethyl-7-aminodecephalosporanic acid inner salt (0.002 mole) is shaken with methylene chloride at room temperature until the mixture is homogeneous. The mixture is cooled in an ice bath and 2,4-dinitrophenyl 1,2,5-thiadiazole-3-acetate (0.002 mole) is added with shaking and the resulting solution left at room temperature until completion of the reaction. The reaction is followed by measuring the intensity of the amide absorption band at 1675 cm.$^{-1}$ in the infrared spectrum. The mixture is filtered and addition of ether precipitates the product, 3 - pyridiniummethyl - 7 - (1,2,5 - thiadiazole-3-acetamido)-decephalosporanic acid inner salt. The product is dissolved in methylene chloride, reprecipitated with ether, collected, dried and found to contain the β-lactam structure as shown by infrared analysis, to inhibit Staph. aureus at low concentrations and to be highly soluble in water.

*Example 5*

Pyridine (10 ml.) was added with stirring to a mixture of water (50 ml.) and 7-(1,2,5-thiadiazole-3-acetamido)-cephalosporanic acid (5 g.) to form a solution which is left under nitrogen at about 45° C. for twelve hours and then extracted four times with 20 ml. methylene chloride. The aqueous phase is concentrated in vacuo at about 30° C. and then passed through a column containing a strongly basic, anion exchange resin of the quaternary ammonium type (e.g., "Dowex 1") in the acetate cycle. The eluates containing the desired pyridine derivative as judged polarimetrically are combined, lyophilized and triturated in methanol to give solid 3-pyridiniummethyl - 7 - (1,2,5 - thiadiazole - 3 - acetamido)decephalosporanic acid inner salt. By concentrating the methanol triturate at 30° C. in vacuo and then pouring the concentrate so obtained into a large volume of acetone there is precipitated an additional amount of this product.

*Example 6*

Substitution of an equal volume of α-picaline, γ-picoline and 2,4-lutidine, respectively, for pyridine in the procedure of Example 5 produces 3 - α - picoliniummethyl - 7 - (1,2,5 - thiadiazole - 3-acetamido)decephalosporanic acid inner salt, 3 - γ - picoliniummethyl - 7 - (1,2,5 - thiadiazole - 3-acetamido)decephalosporanic acid inner salt, and 3 - 2',4' - lutidiniummethyl - 7 - (1,2,5 - thiadiazole - 3-acetamido)decephalosporanic acid inner salt, respectively.

*Example 7*

Substitution of an equimolar amount of 3-γ-picolinium-methyl-7-aminodecephalosporanic acid inner salt for the 3-pyridinium-7-aminodecephalosporanic acid inner salt in the procedure of Example 4 produces 3-γ-picolinium-methyl - 7 - (1,2,5 - thiadiazole - 3 - acetamido)decephalosporanic acid inner salt.

*Example 8*

The product of Example 2 is dissolved in water and treated with acetylesterase obtained from orange peels according to the procedure of Jansen et al., Arch. Biochem., 15, 415 (1947) at pH 6 for 15 hours. The resulting solution is passed through a column containing a weak, anionic ion exchange resin (e.g., "Amberlite IR 4B") in the acetate form and the column is then eluted with aqueous acetic acid which has been adjusted to pH 5.5 with pyridine. The eluate is adjusted to pH 8 by the addition of sodium hydroxide and is then evaporated in vacuo to give 3-hydroxymethyl-7-(1,2,5-thiadiazole-3-acetamido)decephalosporanic acid in the form of its sodium salt.

Example 9

When in Example 2 the 7-aminocephalosporanic acid is replaced by an equimolar amount of 3-methyl-7-aminodecephalosproranic acid there is obtained the sodium salt of 3 - methyl - 7 - (1,2,5 - thiadiazole - 3 - acetamido)-decephalosporanic acid.

Example 10

3-hydroxymethyl-7-aminodecephalosporanic acid lactone (0.002 mole) is shaken with methylene chloride at room temperature until the mixture is homogeneous. The mixture is cooled in an ice bath and 2,4-dinitrophenyl 1,2,5-thiadiazole-3-acetate (0.002 mole) is added with shaking and the resulting solution is held at room temperature until completion of the reaction as followed by measurement of the intensity of the amide absorption band at 1675 cm.$^{-1}$ in the infrared spectrum. After filtration, the addition of ether to the filtrate precipitates 3-hydroxymethyl - 7 - (1,2,5 - thiadiazole - 3 - acetamido)-decephalosporanic acid lactone. The product is dissolved in methylene chloride, reprecipitated by adding ether, collected by filtration and dried.

Example 11

7-aminocephalosporanic acid (0.001 mole) and triethylamine (0.004 mole) are shaken in methylene chloride (2 ml.) until the mixture is homogeneous. This mixture is cooled in an ice bath and 2,4-dinitrophenyl 1,2,5-thiadiazole-3-acetate (0.001 mole) dissolved in 3 ml. methylene chloride is added with shaking; the resulting solution is allowed to stand at room temperature for two hours to complete the reaction. The progress of the reaction is followed by measuring the intensity of the amide absorption band at 1675 cm.$^{-1}$ in the infrared spectrum. The addition of dry ether precipitates the triethylamine salt of 7-(1,2,5-thiadiazole-3-acetamido)cephalosporanic acid.

Example 12

7-aminocephalosporanic acid (10 g., finely divided) is suspended in boiling ethyl acetate (400 ml.) and 1,2,5-thiadiazole-3-acetyl chloride (10 g.) in ethyl acetate (40 ml.) is added. The mixture is boiled under reflux for one hour, cooled and filtered. Aniline (10 ml.) is added and after one hour the mixture is extracted four times with 200 ml. portions of 3% aqueous NaHCO$_3$ and the combined alkaline, aqueous extracts are extracted three times with ethyl acetate (200 ml. portions), discarding the ethyl acetate extract. The aqueous solution is acidified to pH 1.2 and the product, 7-(1,2,5-thiadiazole-3-acetamido) cephalosporanic acid, is twice extracted into ethyl acetate (300 ml.) portions. The combined ethyl acetate extracts are washed with water (4× 100 ml.), dried over anyhydrous MgSO$_4$, filtered to remove the drying agent and concentrate in vacuo at room temperature to precipitate the product, which is recrystallized, if desired, from aqueous acetone or ethanol.

While in the foregoing specification various embodiments of this invention have been set forth in specific detail and elaborated for the purpose of illustration, it will be apparent to those skilled in the art that this invention is susceptible to other embodiments and that many of the details can be varied widely without departing from the basic concept and the spirit and scope of the invention.

I claim:

1. The acid of the formula

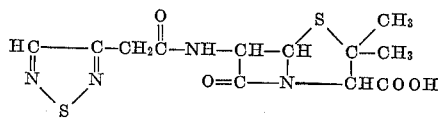

and nontoxic, pharmaceutically acceptable salts thereof.

2. The acid of the formula

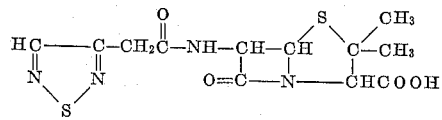

3. The sodium salt of the acid described in claim 1.
4. The potassium salt of the acid described in claim 1.
5. A compound having the formula

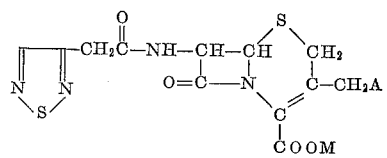

wherein
A is a member selected from the group consisting of hydrogen, hydroxyl, (lower)alkanoyloxy, benzoyloxy, a quaternary ammonium radical of the formula

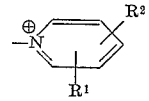

wherein each of R$^1$ and R$^2$ is hydrogen or methyl and when taken together with M, a mono-valent carbon-oxygen bond; and M is a member selected from the group consisting of hydrogen, a pharmaceutically acceptable nontoxic cation, an anionic charge when A is said quaternary ammonium radical and when taken together with A, a monovalent carbon-oxygen bond.

6. A compound having the formula

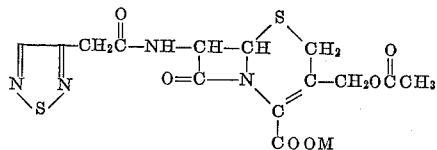

wherein
M is a pharmaceutically acceptable nontoxic cation.

7. A compound having the formula

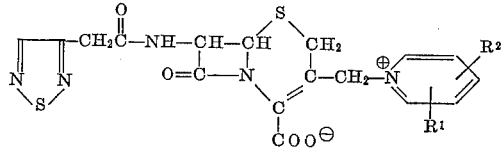

wherein R$^1$ and R$^2$ each represent hydrogen or methyl.

8. 7 - (1,2,5 - thiadiazole - 3 - acetamido) cephalosporanic acid.

9. 3 - Pyridiniummethyl - 7 - (1,2,5 - thiadiazole - 3 - acetamido)decephalosporanic acid inner salt.

10. 3 - Hydroxymethyl - 7 - (1,2,5 - thiadiazole - 3 - acetamido)decephalosporanic acid.

No references cited.

NICHOLAS S. RIZZO, *Primary Examiner.*

UNITED STATES PATENT OFFICE
CERTIFICATE OF CORRECTION

Patent No. 3,322,749                                      May 30, 1967

Leonard Bruce Crast, Jr.

It is hereby certified that error appears in the above numbered patent requiring correction and that the said Letters Patent should read as corrected below.

Column 1, lines 47 to 53, formula (I) should appear as shown below instead of as in the patent:

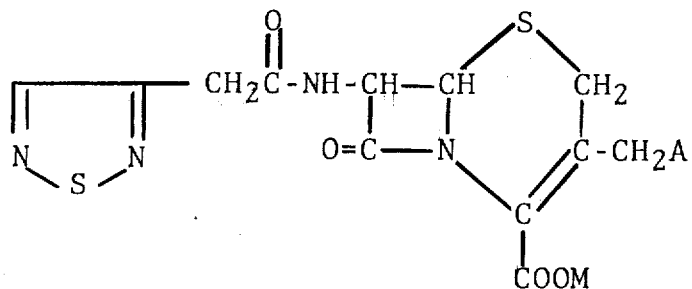

column 2, lines 32 to 37, formula (V) should appear as shown below instead of as in the patent:

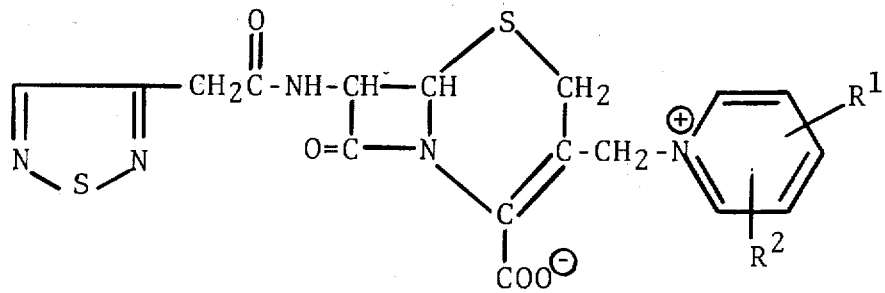

column 4, lines 22 to 27, the formula should appear as shown below instead of as in the patent:

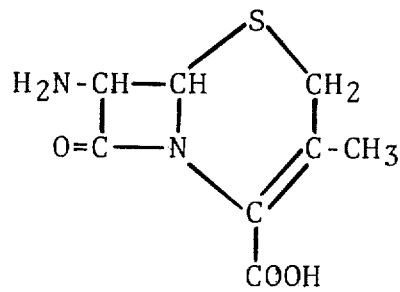

3,322,749 column 6, line 57, for "0.25 meg./ml." read -- 0.25 mcg./ml. --; column 7, line 27, after "10 ml. portions" insert -- of acetone --; line 45, for "230 mgm./pg." read -- 230 mgm./kg. --; column 10, line 67, strike out "No references cited." and insert instead the following references:

References cited by Applicant
UNITED STATES PATENTS
| | | |
|---|---|---|
| 2,941,995 | 6/1960 | Doyle et al. |
| 2,951,839 | 9/1960 | Doyle et al. |
| 2,985,648 | 5/1961 | Doyle et al. |
| 2,996,501 | 8/1961 | Doyle et al. |
| 3,174,964 | 3/1965 | Hobbs et al. |

FOREIGN PATENTS
| | | |
|---|---|---|
| 889,066 | 2/1962 | Great Britain |
| 905,778 | 9/1962 | Great Britain |
| 948,076 | 1/1964 | Great Britain |
| 957,570 | 5/1964 | Great Britain |
| 982,252 | 2/1965 | Great Britain |

Signed and sealed this 17th day of September 1968.

(SEAL)
Attest:

EDWARD M. FLETCHER, JR.
Attesting Officer

EDWARD J. BRENNER
Commissioner of Patents